Figure 1:
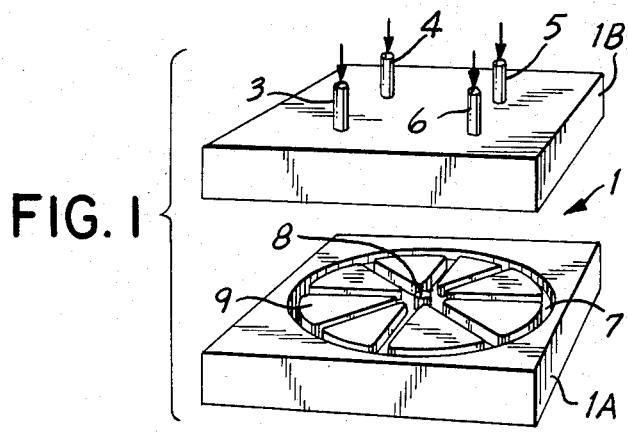
Figure 2A:
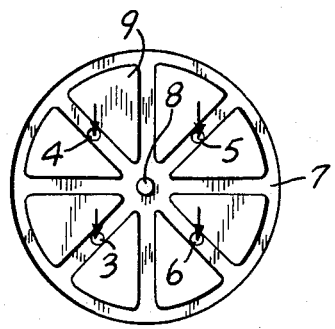
Figure 2B:
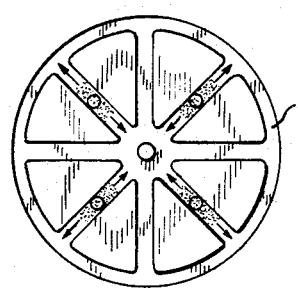
Figure 2C:
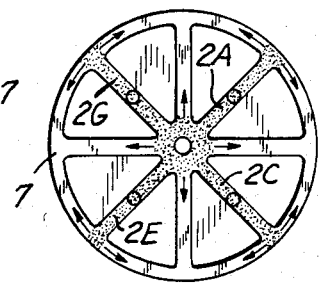
Figure 2D:
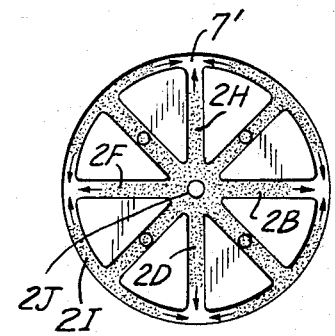

United States Patent [19]

Olsson et al.

[11] Patent Number: 4,497,766

[45] Date of Patent: Feb. 5, 1985

[54] METHOD AND APPARATUS FOR MOLDING PLASTIC WHEELS

[76] Inventors: Jan G. Olsson, SjögÅngen 6, 421 71 Västra Frölunda; Lars Erik Samuelsson, Hedängen 5, 433 70 Partille, both of Sweden

[21] Appl. No.: 453,889
[22] PCT Filed: Mar. 23, 1982
[86] PCT No.: PCT/SE82/00083
 § 371 Date: Dec. 13, 1982
 § 102(e) Date: Dec. 13, 1982
[87] PCT Pub. No.: WO82/03594
 PCT Pub. Date: Oct. 28, 1982

[30] Foreign Application Priority Data

Apr. 14, 1981 [SE] Sweden .............................. 8102395

[51] Int. Cl.³ .............................................. B29C 1/00
[52] U.S. Cl. ................................... 264/328.8; 249/56; 264/328.12; 425/542
[58] Field of Search ............... 249/56; 264/328.12, 264/328.8, 274, 276; 425/DIG. 227, 120, 542

[56] References Cited

U.S. PATENT DOCUMENTS 1,510,231  9/1924  Keller .................................... 249/56
2,043,584  6/1936  Husted ............................. 264/328.8
2,199,144  4/1940  Tegarty ....................... 264/328.12 X

FOREIGN PATENT DOCUMENTS 1279871  2/1961  France ............................. 264/328.8

OTHER PUBLICATIONS

"Weld-line Fracture in Molded Parts", Hagerman, *Plastics Engineering*, Oct. 1973, pp. 67–69.

*Primary Examiner*—James Lowe

[57] ABSTRACT

A method and a mold for the manufacture of a wheel construction (2) of plastic material for vehicles or the like, which comprises a number of spokes (2A–2H), a hub (2J) and a rim (2I) together constituting an integrated unit. The plastic material is injected in a mold (1), the cavity (7) of which exhibits a form corresponding to the one of the desired wheel construction, the design of the wheel being chosen to comprise an even number of spokes (2A–2H). The inlets (3–6) are located at such points near to every second one of the spoke portions (2A–2H) forming part of said mold (1), that the zones (7'), where the flows of material join each other, will be located near to points, where the spoke portions (2B, 2D, 2F, 2H), free from inlets, blend into the rim (2I).

2 Claims, 7 Drawing Figures

U.S. Patent  Feb. 5, 1985  4,497,766

METHOD AND APPARATUS FOR MOLDING PLASTIC WHEELS

The present invention relates to a method of and a means for the manufacture of a wheel construction of plastic material for vehicles or the like, which comprises a number of spokes together with a hub and a rim forming an integrated unit.

In previously known methods for the manufacture of similar wheel constructions of plastic material the gates of the mould for the injection of plastic material have been designed in such a manner that the points, where the material flows are joined, the fusing line, will be located at points, which adversely affect the strength of the wheel construction, by way of example on the rim between two spokes. The strength of the wheel construction has thereby been quite substantially affected in a negative manner, as such portions of such a wheel made of plastic material and subjected to a load in zones where the material flow of the plastic shows discrepances, run the risk of suffering breakages in said zones.

It is a principal object of the invention to provide a method for the manufacture of a wheel construction of plastic material of the type mentioned above, in which the material flows, the fusing lines, will be located at such points of the wheel construction, that the strength properties of the construction are essentially improved compared with such wheel constructions of the prior art.

Said object is obtained by means of a method according to the present invention, which is substantially characterized by injecting the plastic material in a mould, the cavity of which has a shape that corresponds to the one of the desired wheeel construction, the design of the wheel being chosen to comprise an even number of spokes and the gates being located at such points near to every second one of the spoke portions of said mould that the zones, where the flows of material join each other, will be located near to the points, where the spokes, free from inlets, blend into the rim.

The invention is described in the following, reference being made to the accompanying drawing, in which FIG. 1 is a schematic view of a mould suitable for use in connection with a method according to the present invention.

Figure 3:
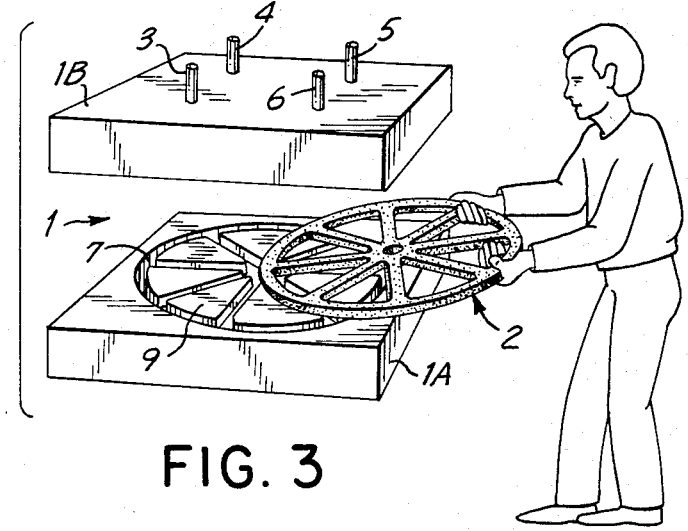
Figure 2E:
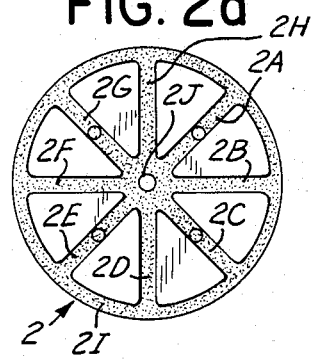

FIGS. 2a-e are schematical views showing different phases of the flow of the plastic material in a mould in connection with a method according to the present invention, and FIG. 3 is a view of the manner, in which a moulded wheel construction of plastic material is taken out of the mould, in which it has been moulded.

A mould 1 suitable to be used in connection with a method for the manufacture of such a wheel construction, that is related to the present invention, can suitably be of the kind, which is illustrated in FIG. 1 of the drawing. Such a mould that serves as an example only comprises a lower part 1A and an upper part 1B, which are designed to be put together in a tight fit and to be separated from each other in order to permit the extraction of a moulded wheel construction 2, as is shown in FIG. 3. The mould 1 can also be designed in such a manner that it can be split up in more components than the two illustrated parts. The lower part can for example be designed in such a manner that it can be split across the plane of rotation of the same and of the wheel in order to facilitate the extraction of a moulded wheel from the mould, and especially, if the wheel has a complicated profile with undercut portions etc. making it impossible to extract such a wheel from the mould in the manner illustrated in FIG. 3.

The mould 1 is provided with a suitable number of injection inlets. Said inlets can then to advantage be arranged as connecting inlets 3, 4, 5 and 6 of the lid of the mould 1B, as is shown in FIGS. 1 and 3.

The lower portion 1A of the mould 1 exhibits a cavity 7, which together with the lid 1B defines a form that corresponds to the desired wheel construction. A pin 8 for the hub and a number of sector-shaped mould elements 9 which are distributed around said pin 8, are received in a circular recess, which defines the periphery of the peripherical form of the desired wheel construction, and thereby form the core of the mould 1.

In the illustrated example the mould 1 is designed to form a wheel construction 2 exhibiting eight spokes 2A-2H, but the mould can of course be designed, so that a wheel construction can be provided with fewer or more spokes than is the case in the illustrated example. However, it is essential that the wheel construction is provided with an even number of spokes, as it is otherwise not possible to make a wheel construction of plastic material, which exhibits sufficient strength properties.

The method to manufacture a wheel construction illustrated in the drawing by means of a mould illustrated in the drawing is carried out in the following manner: The plastic material is injected in liquid form in the inlets 3-6 of the mould part 1B, which in this position fits tightly to the lower part 1A. The inlets 3-6 are in such a position that they empty into the cavity 7 of the mould, which cavity exhibits the form, that corresponds to the desired wheel construction, and in the zone of every second one of the spoke portions 2A, 2C, 2E and 2G, by way of example at the mid-portion of the same. The distribution of the flow of the plastic material in the cavity 7 is marked with a darker shade than the empty space of the cavity 7, which shall be completely filled with plastic material, that is illustrated with a lighter shade. Arrows mark in the drawing the direction of flow of the plastic material in said cavity 7. The material first flows in the radial direction of the spokes 2A, 2C, 2E and 2G in direction towards the cavity for the rim 2I and inwards towards the pin 8.

As the plastic material fills up said zones the spokes 2A-2H, the rim 2I and the hub 2J are formed in the mould.

As is evident from FIG. 2 the joining of flows of plastic material takes place in the zones 7' near to the points where the spoke portions 2B, 2D, 2F and 2H, free from inlets, blend into the rim 2I.

The ready-moulded wheel construction 2 is thereafter extracted of the mould 1, when the mould parts 1A, 1B have been separated from each other, as is shown in FIG. 3, in order to be subjected to possible subsequent machining operations.

The invention is not limited to the embodiment illustrated in the drawing and described above, but can be varied within the scope of the following claims.

Other designs of the moulds than the ones shown are of course possible. The mould parts can for example be designed in such a manner that the plane for the wheel construction in the mould will be substantially vertical.

We claim:

1. A method of manufacturing a wheel of plastic material, for vehicles or the like, said wheel having an even number of spokes in excess of two, a hub and a rim, said spokes, hub and rim together constituting an integral unit, comprising the steps of:

preparing a mold corresponding in shape to said wheel so as to have a cavity comprising spoke portions, a hub and a rim and having inlets located at points in every second spoke portion, and injecting the plastic material into said inlets, whereby the flows of injected material join each other in the spoke portions free from inlets and adjacent the rim.

2. A mold for manufacturing a wheel of plastic material, said wheel having spokes, a hub and a rim forming an integral unit, said mold having a cavity of a form corresponding to the wheel with an even number of spoke-forming portions in excess of two, and with inlets emptying into every second spoke-forming portion at a location so that flows of plastic material injected into said inlets will meet in the spoke forming portions free from inlets and adjacent the rim.

* * * * *